US012213061B2

(12) United States Patent
Rayanki et al.

(10) Patent No.: US 12,213,061 B2
(45) Date of Patent: *Jan. 28, 2025

(54) CHANNEL DISCOVERY IN A SMALL-CELL NETWORK

(71) Applicant: ARRIS Enterprises LLC, Suwanee, GA (US)

(72) Inventors: Ramesh Rayanki, Sunnyvale, CA (US); Shailender Potharaju, Fremont, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,696

(22) Filed: Jul. 19, 2023

(65) Prior Publication Data

US 2023/0370960 A1    Nov. 16, 2023

Related U.S. Application Data

(63) Continuation of application No. 17/195,147, filed on Mar. 8, 2021, now Pat. No. 11,711,753.
(Continued)

(51) Int. Cl.
*H04W 48/20*   (2009.01)
*H04W 4/06*    (2009.01)
(Continued)

(52) U.S. Cl.
CPC ............. *H04W 48/16* (2013.01); *H04W 4/06* (2013.01); *H04W 16/14* (2013.01); *H04W 24/10* (2013.01); *H04W 48/10* (2013.01)

(58) Field of Classification Search
CPC ....... H04W 48/10; H04W 24/10; H04W 16/14; H04W 48/16; H04W 4/06
See application file for complete search history.

(56) References Cited

U.S. PATENT DOCUMENTS

| 2009/0052382 | A1 | 2/2009 | Stephenson et al. |
| 2012/0134328 | A1 | 5/2012 | Gauvreau et al. |

(Continued)

OTHER PUBLICATIONS

"Notification of Transmittal of the International Search Report and the Written Opinion of the International Searching Authority, or the Declaration for corresponding International Application No. PCT/US2021/20859, mailing date: Jul. 15, 2021, (13 pages)".

*Primary Examiner* — Dai Phuong
(74) *Attorney, Agent, or Firm* — Steven Stupp

(57) ABSTRACT

During operation, the radio node may, using a first interface circuit, listen for transmissions from one or more second radio nodes. Based at least in part on the transmissions, the radio node may determine a first list of discovered channels associated with the radio node and the one or more second radio nodes. Then, the radio node may, using a second interface circuit, provide the first list of discovered channels to the one or more second radio nodes. Moreover, the radio node may, using the second interface circuit, receive one or more second lists of discovered channels from the one or more second radio nodes. Next, the radio node may aggregate the first list of discovered channels and the second list of discovered channels into a list of active channels. Furthermore, the radio node may, using the first interface circuit, provide the list of active channels to an electronic device.

20 Claims, 10 Drawing Sheets

Related U.S. Application Data

(60) Provisional application No. 62/987,312, filed on Mar. 9, 2020.

(51) Int. Cl.
  *H04W 16/14* (2009.01)
  *H04W 24/10* (2009.01)
  *H04W 48/10* (2009.01)
  *H04W 48/16* (2009.01)

(56) References Cited

U.S. PATENT DOCUMENTS

| | | |
|---|---|---|
| 2014/0086081 A1 | 3/2014 | Mack et al. |
| 2015/0334612 A1 | 11/2015 | Ray Chaudhuri et al. |
| 2016/0219591 A1* | 7/2016 | Lee ............... H04W 40/244 |
| 2017/0289997 A1 | 10/2017 | Touag et al. |
| 2018/0279130 A1* | 9/2018 | Huang ............ H04W 72/0453 |
| 2018/0376341 A1 | 12/2018 | Khoshnevisan et al. |
| 2019/0132806 A1 | 5/2019 | Kumar et al. |
| 2020/0205060 A1 | 6/2020 | Karimli et al. |
| 2020/0229179 A1 | 7/2020 | Fan et al. |
| 2021/0185541 A1* | 6/2021 | Potharaju ............ H04W 16/14 |
| 2021/0243676 A1* | 8/2021 | Files ............... H04W 48/06 |

* cited by examiner

CHANNEL DISCOVERY IN A SMALL-CELL NETWORK

CROSS REFERENCE TO RELATED APPLICATIONS

This application is a continuation of U.S. Non-Provisional application Ser. No. 17/195,147, "Channel Discovery in a Small-Cell Network," filed on Mar. 8, 2021, by Ramesh Rayanki, et al., which claims priority under 35 U.S.C. 119(e) to: U.S. Provisional Application Ser. No. 62/987,312, "Channel Discovery in a Small-Cell Network," filed on Mar. 9, 2020, by Ramesh Rayanki, et al., the contents of both of which are herein incorporated by reference.

FIELD

The described embodiments relate to techniques for communicating information among electronic devices. Notably, the described embodiments relate to techniques for aggregating and distributing a list of channels associated with radio nodes.

BACKGROUND

While many electronic devices communicate with each other via large networks owned by a network operator, small-scale networks associated with entities (such as a company or an organization) are increasingly common. In principle, the small-scale network complements the service offered by the network operator and can offer improved communication performance, such as in a particular venue or environment. In practice, the communication performance of small-scale networks (and large networks) is often constrained by resources, such as bandwidth in a shared communication channel.

In order to address these constraints, additional bands of frequencies are being used by large networks and small-scale networks. For example, the shared-license-access band of frequencies near 3.5 GHz (notably, the 150 MHz of bandwidth between 3.55 GHz and 3.7 GHz) is being used for general-purpose communication. This shared-license-access band of frequencies is referred to as 'Citizens Broadband Radio Service' or CBRS.

In CBRS, a radio node (which is sometimes referred to as a 'Citizens Band Service Device' or CBSD) may provide a grant request to a SAS (a cloud-based service that manages wireless communication in the CBRS) to reserve a portion of the spectrum or bandwidth in the shared-license-access band of frequencies, in a particular geographic region, for its use. For example, a radio node may request a grant to reserve 5 MHz of spectrum from the SAS in a particular geographic region. If the requested portion of the spectrum is available, the SAS may provide a grant response to the radio node with approval of a grant for the requested portion of the spectrum. Then, the radio node may provide a heartbeat request to the SAS to request authorization to transmit in the granted portion of the spectrum. When the radio node receives a subsequent heartbeat response from the SAS, the radio node is authorized to transmit in the granted portion of the spectrum.

Because the portions of the spectrum in CBRS are dynamically allocated, the channels or frequencies used by the radio nodes in a small-scale network are not deterministic. Indeed, in general, the channels or frequencies may vary as a function of time. Consequently, it is often difficult to preprogram the channels or frequencies used in a small-scale network (such as at a venue or location) into electronic devices (such as cellular telephones). Therefore, in order to determine the channels or frequencies, an electronic device may need to perform a scan of the full CBRS spectrum of 150 MHz, which is time-consuming, increases the power consumption of the electronic device, and can adversely impact the communication performance of the electronic device and, thus, the user experience.

SUMMARY

In a first group of embodiments, a radio node that aggregates a list of active channels is described. This radio node includes: a first node or connector; a second node or connector; a first interface circuit, coupled to the first node or connect, that communicates using wireless communication; and a second interface circuit, coupled to the second node or connector, that communicates with one or more second radio nodes in a network. During operation, the radio node may, using the first interface circuit, listen for transmissions associated with the one or more second radio nodes. Based at least in part on the transmissions, the radio node may determine a first list of discovered channels associated with the radio node and the one or more second radio nodes. Then, the radio node may, using the second interface circuit, provide the first list of discovered channels addressed to the one or more second radio nodes. Moreover, the radio node may, using the second interface circuit, receive one or more second lists of discovered channels associated with the one or more second radio nodes. Next, the radio node may aggregate the first list of discovered channels and the second list of discovered channels into the list of active channels. Furthermore, the radio node may, using the first interface circuit, provide the list of active channels addressed to an electronic device.

Note that the radio node may provide the list of first discovered channels using a multicast message.

Moreover, the network may include a small cell.

Furthermore, the channels may be portions of a spectrum in a shared-license-access band of frequencies. For example, the channels may be included in a Citizens Broadband Radio Service.

Additionally, the radio node may, using the second interface circuit, provide the list of discovered channels and/or the list of active channels addressed to a computer. Note that the computer may include a controller for the radio node and the one or more second radio nodes. Consequently, the computer may be different from a SAS.

In some embodiments, the second interface circuit may use wired communication.

Moreover, the radio node may include: an Evolved Node B (eNodeB), a Universal Mobile Telecommunications System (UMTS) NodeB and radio network controller (RNC), a New Radio (NR) gNB or gNodeB (which communicates with the network with a cellular-telephone communication protocol that is other than Long Term Evolution), etc.

Another embodiment provides the computer.

Another embodiment provides the electronic device. After receiving the list of active channels, the electronic device may perform a scan of a band of frequencies (such as a shared-license-access band of frequencies) based at least in part on the list of active channels. For example, the scan may be restricted to channels in the list of active channels.

Another embodiment provides a computer-readable storage medium with program instructions for use with the radio node, the computer or the electronic device. When executed by the radio node, the computer or the electronic device, the program instructions cause the radio node to perform at least some of the aforementioned operations in one or more of the preceding embodiments.

Another embodiment provides a method, which may be performed by the radio node, the computer or the electronic device. This method includes at least some of the aforementioned operations in one or more of the preceding embodiments.

In a second group of embodiments, a radio node that provides a list of active channels is described. This radio node includes: a first node or connector; a second node or connector; a first interface circuit, coupled to the first node or connector, that communicates using wireless communication; and a second interface circuit, coupled to the second node or connector, that communicates with a computer. During operation, the radio node may, using the second interface circuit, provide, addressed to the computer, information specifying a channel used by the radio node. Then, the radio node may, using the second interface circuit, receive, associated with the computer, the list of active channels associated with the radio node and one or more second radio nodes in a network. Next, the radio node may, using the first interface circuit, provide the list of active channels addressed to an electronic device.

Moreover, the network may include a small cell.

Furthermore, the channels may be portions of a spectrum in a shared-license-access band of frequencies. For example, the channels may be included in a Citizens Broadband Radio Service.

Additionally, the computer may include a controller for the radio node and the one or more second radio nodes. Consequently, the computer may be different from a SAS.

In some embodiments, the second interface circuit may use wired communication.

Moreover, the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Another embodiment provides the computer. This computer may aggregate the information from the radio node and the one or more second radio nodes in the network into the list of active channels, which is then provided to the radio node and the one or more second radio nodes.

Another embodiment provides the electronic device. After receiving the list of active channels, the electronic device may perform a scan of a band of frequencies (such as a shared-license-access band of frequencies) based at least in part on the list of active channels. For example, the scan may be restricted to channels in the list of active channels.

Another embodiment provides a computer-readable storage medium with program instructions for use with the radio node, the computer or the electronic device. When executed by the radio node, the computer or the electronic device, the program instructions cause the radio node to perform at least some of the aforementioned operations in one or more of the preceding embodiments.

Another embodiment provides a method, which may be performed by the radio node, the computer or the electronic device. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
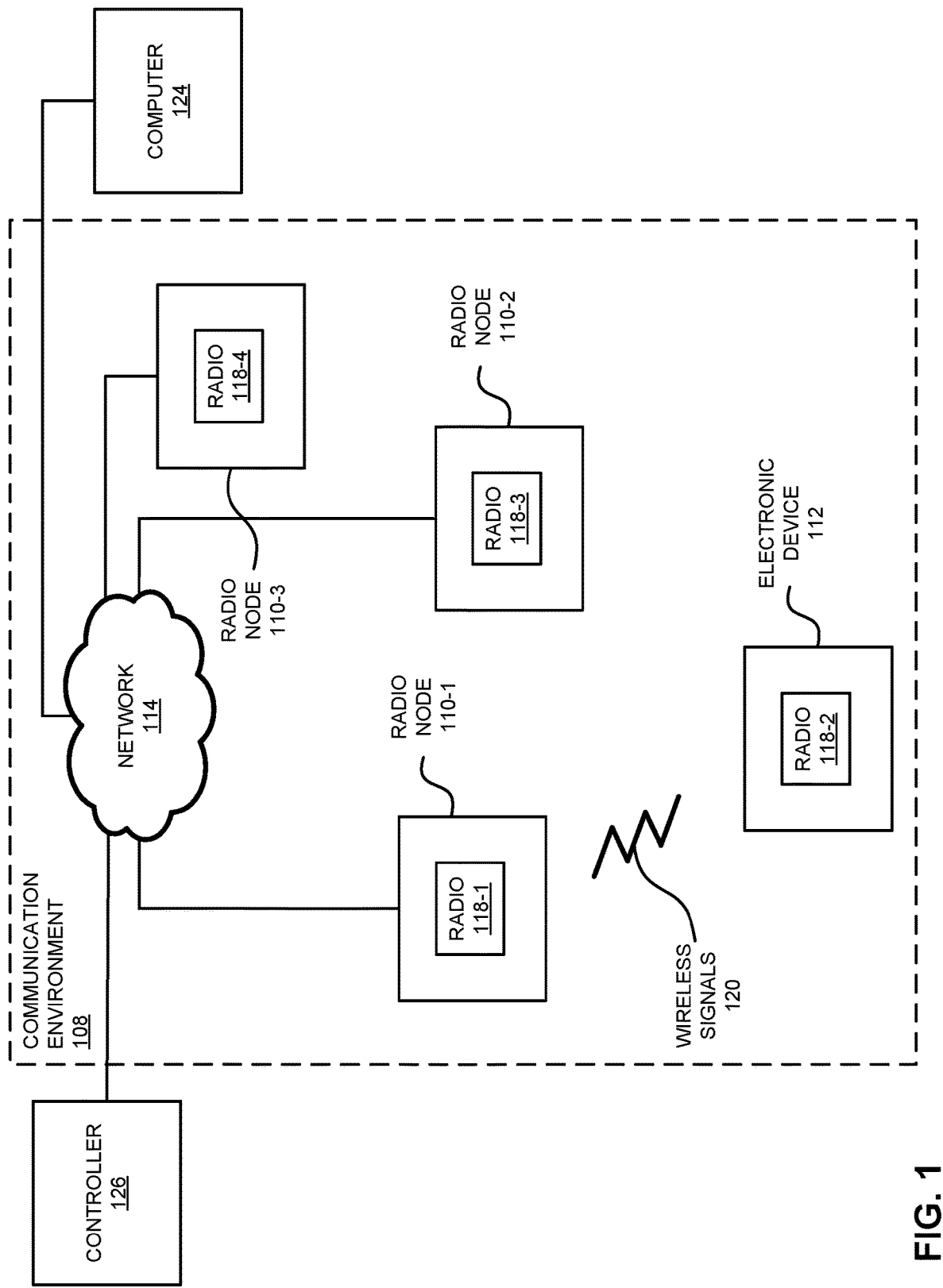
FIG. 1 is a block diagram illustrating an example of communication among a computer, radio nodes and electronic devices in a system in accordance with an embodiment of the present disclosure.

In a first group of embodiments, a radio node (such as an eNode-B) that aggregates a list of active channels is described. During operation, the radio node may, using a first interface circuit, listen for transmissions from one or more second radio nodes. Based at least in part on the transmissions, the radio node may determine a first list of discovered channels associated with the radio node and the one or more second radio nodes. Then, the radio node may, using a second interface circuit, provide the first list of discovered channels to the one or more second radio nodes. Moreover, the radio node may, using the second interface circuit, receive one or more second lists of discovered channels from the one or more second radio nodes. Next, the radio node may aggregate the first list of discovered channels and the second list of discovered channels into the list of active channels. Furthermore, the radio node may, using the first interface circuit, provide the list of active channels to an electronic device (such as a cellular telephone).

Alternatively or additionally, in a second group of embodiments, a radio node that provides a list of active channels is described. During operation, the radio node may, using a second interface circuit, provide, to a computer, information specifying a channel used by the radio node. Then, the radio node may, using the second interface circuit, receive, from the computer, the list of active channels associated with the radio node and one or more second radio nodes in a network. Next, the radio node may, using a first interface circuit, provide the list of active channels to an electronic device.

By aggregating and/or providing the list of active channels, these communication techniques may reduce a scan time in a band of frequencies (such as a shared-license-access band of frequencies, e.g., the CBRS) performed by the electronic device. For example, the electronic device may perform a scan restricted to channels in the list of active channels. In the process, the communication techniques may improve battery life of the electronic device and/or communication performance of the electronic device. Consequently, the communication techniques may improve a user experience when using the electronic device and/or communicating with the radio node.

We now describe some embodiments of the communication techniques. A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication techniques.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

In a cellular-telephone network, cellular telephones or, more generally, electronic devices associated with a mobile network operator can be pre-programmed with a list of active channels and bands of frequencies. Unless a cellular telephone is roaming, his information may allow the cellular telephone to rapidly connect with the cellular-telephone network. However, because the channels used by radio nodes in a small cell are dynamically allocated (and, thus, can vary as a function of time), it typically not possible to pre-program a list of active channels into electronic devices that use the small cell. Without this information, a cellular telephone or an electronic device may need to scan the entire band of frequencies associated with the small cell to discover the active channels, which is time-consuming and increases power consumption. For example, the CBRS includes 150 MHz, which can include up to thirty 5 MHz channels.

These challenges are addressed in the communication techniques described below. Notably, the radio nodes in a small cell may collaboratively aggregate a list of active channels, which is then disseminated to the electronic devices. Alternatively or additionally, the radio nodes in a small cell may provide information specifying their granted and allocated channels to computer, which aggregates this information into the list of active channels. Then, the computer may provide the list of active channels to the radio nodes, which disseminate it to the electronic devices. Consequently, the communication techniques may provide a distributed and/or a centralized approach for aggregating the list of active channels. Moreover, using the list of active channels, an electronic device may restrict a scan in a band of frequencies associated with the small cell (e.g., to the channels in the list of active channels), thereby reduced the scan time and the power consumption of the electronic device.

In the discussion that follows, Long Term Evolution or LTE (from the 3rd Generation Partnership Project of Sophia Antipolis, Valbonne, France) is used as an illustration of a data communication protocol in a cellular-telephone network or a network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among electronic devices according to some embodiments. Notably, radio nodes 110 can communicate LTE data frames or packets using LTE with an electronic device 112 (which is sometimes referred to as 'user equipment' or UE, such as a cellular telephone and, more generally, a portable electronic device) in a communication environment 108 or a venue. Again, while LTE is used as an example of a cellular protocol, the embodiments herein are not so limited. Moreover, radio nodes 110 may also communicate (via wireless or wired communication, such as Ethernet, in network 114) with each other and with a computer 124 (such as a SAS) or a controller or management computer for radio nodes 110 (such as a controller 126).

Figure 2:
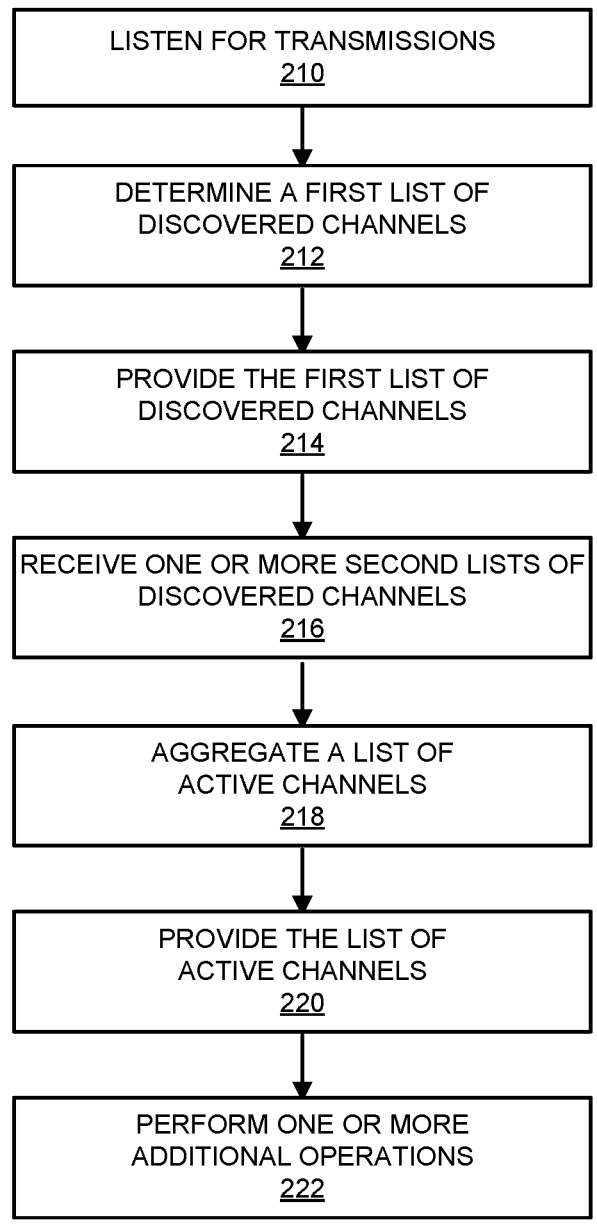
FIG. 2 is a flow diagram illustrating an example of a method for aggregating a list of active channels using a radio node in FIG. 1 in accordance with an embodiment of the present disclosure.

As described further below with reference to FIGS. 2-4, one or more of radio nodes 110 may perform the communication techniques by communicating with other radio nodes 110 via network 114. Using radio node 110-1 as an example, this radio node may listen for wireless transmissions from at least some (such as one or more) of the remaining radio nodes 110. For example, radio node 110-1 may perform a network listen. Based at least in part on the transmissions, radio node 110-1 may determine a first list of discovered channels associated with radio node 110-1 and at least some of the remaining radio nodes 110, such as a list of the channels used by radio node 110-1 and at least some of the remaining radio nodes 110 in a band of frequencies (such as the CBRS) in a network (such as a small cell). Then, radio node 110-1 may provide, via network 114, the first list of discovered channels to one or more of the remaining radio nodes 110. Moreover, one or more of the remaining radio nodes 110 may also listen for wireless transmission and may determine second lists of discovered channels, which are provided, via network 114, to other radio nodes 110. Consequently, radio node 110-1 may receive, via network 114, one or more second lists of discovered channels from the one or more of the remaining radio nodes 110. Next, radio node 110-1 may aggregate the first list of discovered channels and the second list of discovered channels into a list of active channels that are used by radio nodes 110 in the band of frequencies. Furthermore, radio node 110-1 may provide the list of active channels to an electronic device (such as electronic device 112) using wireless communication.

Alternatively or additionally, as described below with reference to FIGS. 5-7, radio node 110-1 may provide, via network 114, information specifying one or more channels used by radio node 110-1 in the band of frequencies to a computer, such as controller 126. The remaining radios nodes 110 may also provide, via network 114, similar information about their channels to controller 126. Then, controller 126 may aggregate the information into a list of active channels that are used by radio nodes 110 in the band of frequencies in the network. Moreover, controller 126 may provide, via network 114, the list of active channels to radio nodes 110. Consequently, radio node 110-1 may receive, via network 114, the list of active channels. Next, radio node 110-1 may provide the list of active channels to an electronic device (such as electronic device 112) using wireless communication.

After receiving the list of active channels, electronic device 112 may perform a scan in the band of frequencies based at least in part on the list of active channels. For example, the scan may be restricted to channels in the list of active channels.

In these ways, the communication techniques may allow electronic device 112 to perform a more efficient and, thus, a faster scan in the band of frequencies. In addition to reducing the power consumption and improving the communication performance of electronic device 112, this capability may reduce a time delay or latency for electronic device 112 to discover a particular radio node in radio nodes 110 and to establish a connection with this radio node.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 10:
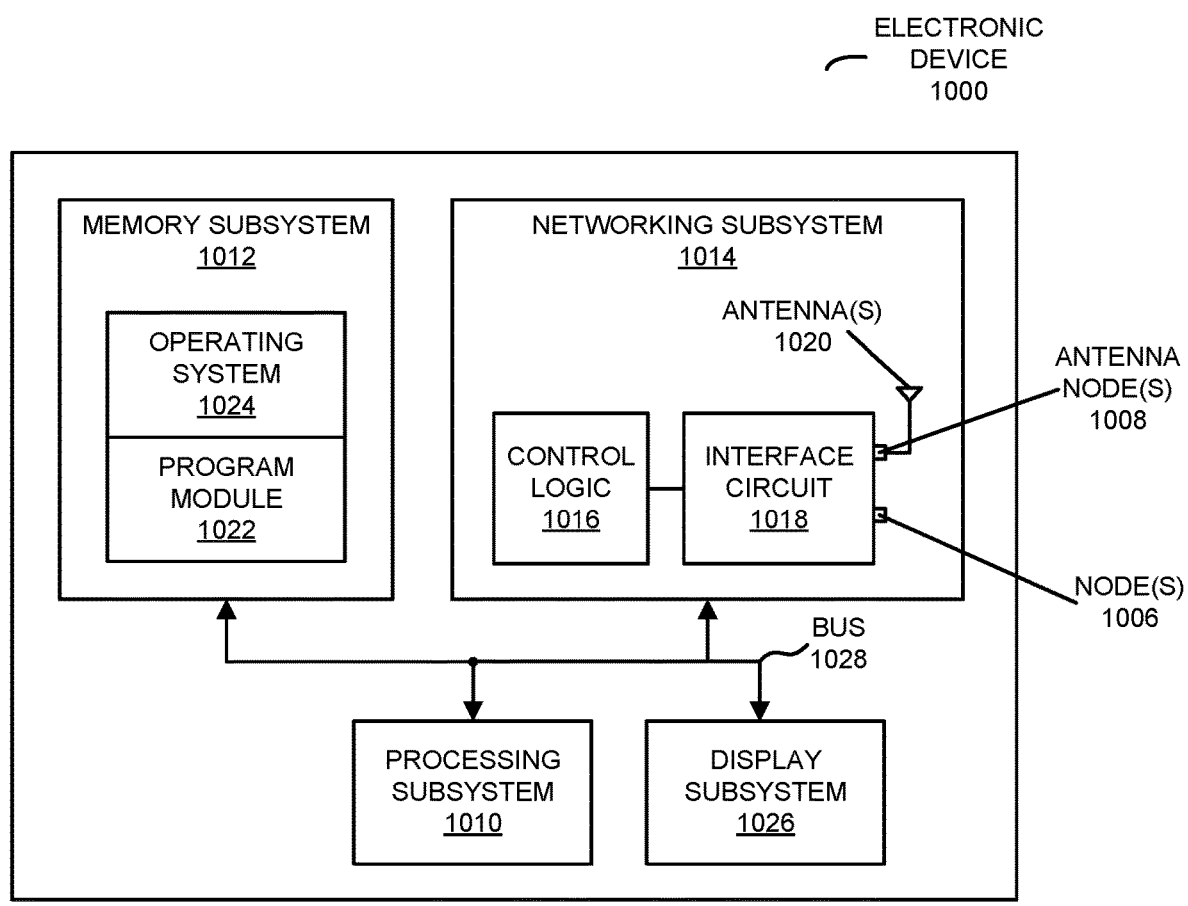
FIG. 10 is a block diagram illustrating an example of an electronic device in accordance with an embodiment of the present disclosure.

As described further below with reference to FIG. 10, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

We now describe embodiments of the method. FIG. 2 presents a flow diagram illustrating an example of a method 200 for aggregating a list of available channels, which may be performed by a radio node (such as one of radio nodes 110 in FIG. 1). During operation, a first interface circuit in the radio node may listen for transmissions (operation 210)

associated with the one or more second radio nodes. For example, the radio node may perform a network listen.

Based at least in part on the transmissions, the radio node may determine a first list of discovered channels (operation 212) associated with the radio node and the one or more second radio nodes. For example, the list of discovered channels may include channels that are used by the radio node and the one or more second radio nodes.

Then, a second interface circuit in the radio node may provide the first list of discovered channels (operation 214) addressed to the one or more second radio nodes. For example, the list of discovered channels may be provided using a multicast message. Moreover, the second interface circuit in the radio node may receive one or more second lists of discovered channels (operation 216) associated with the one or more second radio nodes.

Next, the radio node may aggregate the first list of discovered channels and the second list of discovered channels into the list of active channels (operation 218). Furthermore, a first interface circuit in the radio node may provide the list of active channels addressed (operation 220) to an electronic device.

Moreover, radio node and the one or more second radio nodes may be in a network, such as a small cell. Furthermore, the channels may be portions of a spectrum in a shared-license-access band of frequencies. For example, the channels may be included in a CBRS.

In some embodiments, the second interface circuit may use wired communication.

Note that the radio node may include: an eNodeB, a UMTS NodeB and RNC, a New Radio (NR) gNB or gNodeB, etc.

In some embodiments, the radio node optionally performs one or more additional operations (operation 222). For example, the second interface circuit may provide the list of discovered channels and/or the list of active channels addressed to a computer. Note that the computer may include a controller for the radio node and the one or more second radio nodes. Consequently, the computer may be different from a SAS.

In some embodiments of method 200, there may be additional or fewer operations. Furthermore, the order of the operations may be changed, and/or two or more operations may be combined into a single operation.

Figure 3:
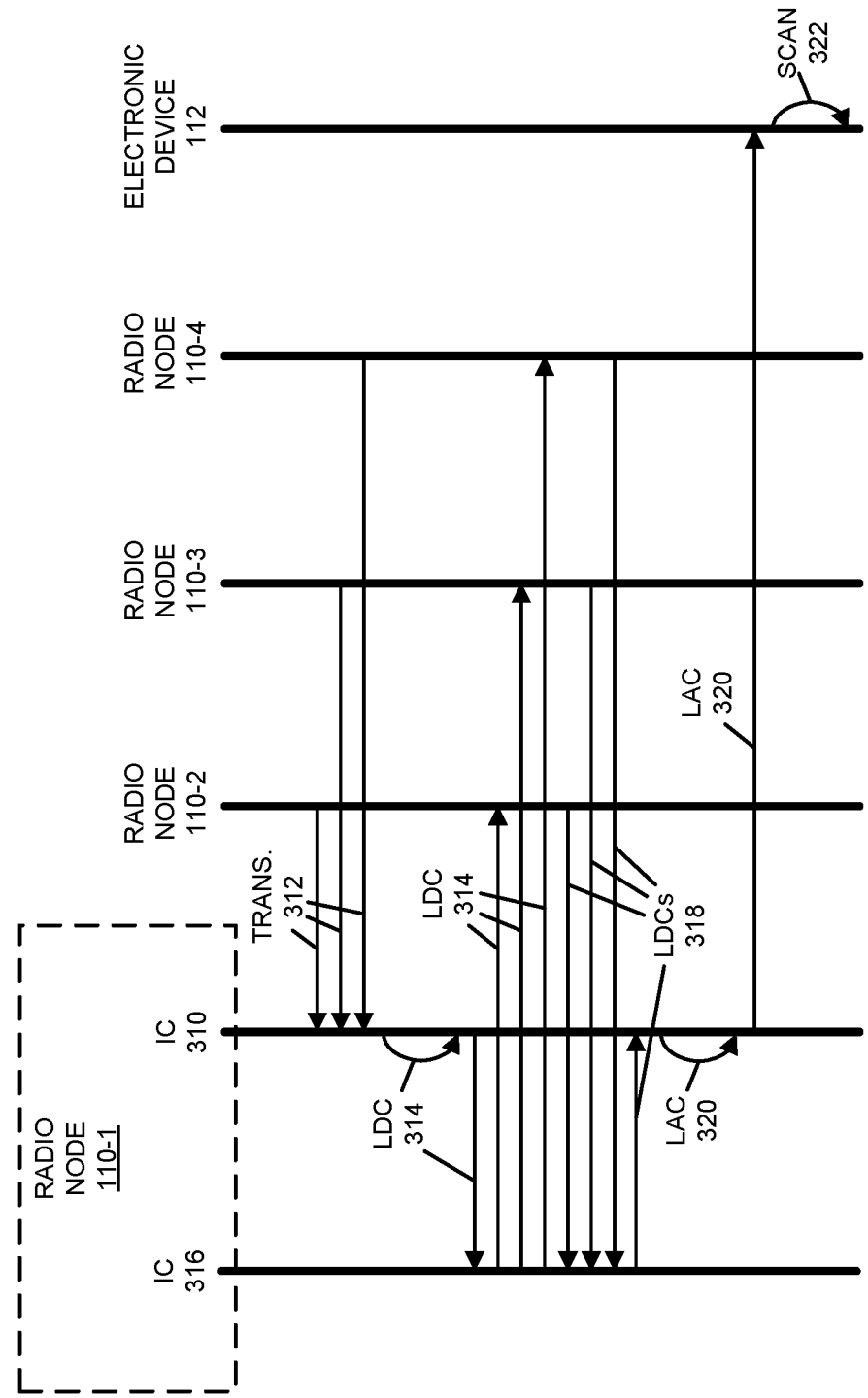
FIG. 3 is a drawing illustrating an example of communication among the electronic devices in FIG. 1 in accordance with an embodiment of the present disclosure.
Figure 4:
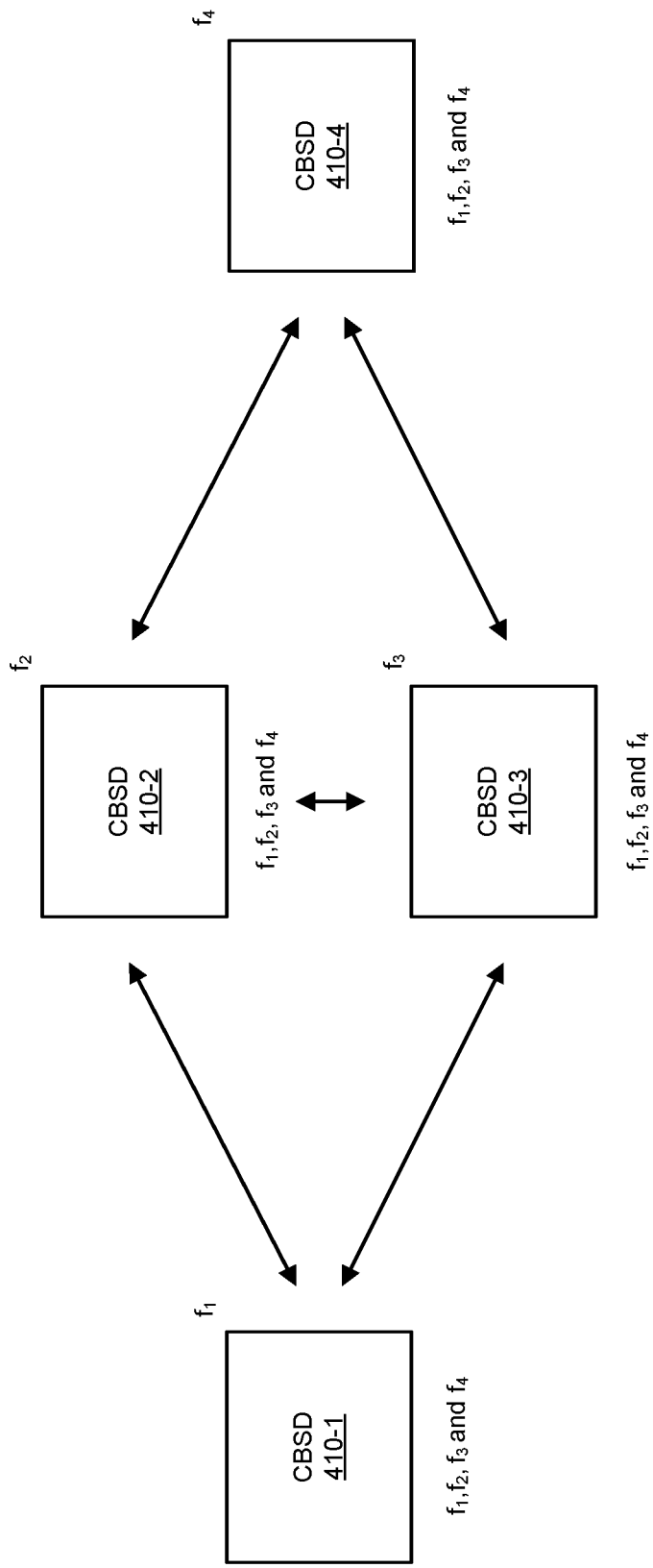
FIG. 4 is a drawing illustrating an example of a technique for aggregating a list of active channels in accordance with an embodiment of the present disclosure.

Embodiments of the communication techniques are further illustrated in FIG. 3, which presents a drawing illustrating an example of communication among radio nodes 110 and electronic device 112. In FIG. 3, an interface circuit (IC) 310 in radio node 110-1 may listen for wireless transmissions 312 associated with one or more of radio nodes 110-2, 110-3, or 110-4. For example, transmissions 312 may include one or more packets or frames transmitted by one or more of radio nodes 110-2, 110-3 or 110-4. Based at least in part on transmissions 312, the interface circuit 310 may determine a list of discovered channels (LDC) 314 associated with radio node 110-1 and one or more of radio nodes 110-2, 110-3 or 110-4.

Then, interface circuit 310 may provide the list of discovered channels 314 to interface circuit 316 in radio node 110-1, which may provide the list of discovered channels 314 to one or more of radio nodes 110-2, 110-3 or 110-4. For example, the list of discovered channels 314 may be provided using a multicast message that is communicated using wired communication. Moreover, radio nodes 110-2, 110-3 and/or 110-4 may provide one or more lists of discovered channels 318 (which were discovered by radio nodes 110-2, 110-3 and/or radio node 110-4) to radio node 110-1.

After receiving the one or more lists of discovered channels 318, interface circuit 316 may provide the one or more lists of discovered channels 318 to interface circuit 310. Next, interface circuit 310 may aggregate the list of discovered channels 314 and the one or more lists of discovered channels 318 into a list of active channels (LAC) 320. For example, aggregating the list of discovered channels 314 and the one or more lists of discovered channels 318 may involve removing redundant or duplicated channels that were discovered by more than one of radio nodes 110.

Furthermore, interface circuit 310 in radio node 110-1 may provide the list of active channels 320 to electronic device 112. After receiving the list of active channels 320, electronic device 112 may perform a wireless scan 322 based at least in part on the list of active channels 320.

While FIG. 3 illustrates communication between components using unidirectional or bidirectional communication with lines having single arrows or double arrows, in general the communication in a given operation in this figure may involve unidirectional or bidirectional communication.

In some embodiments of the communication techniques, a radio node aggregates a list of active channels in a network, which is then provided to an electronic device (such as a cellular telephone) that is connected to radio node. This is illustrated in FIG. 4, which presents a drawing illustrating an example of a technique for aggregating a list of active channels used by CBSDs 410 in the CBRS. Notably, CBSDs 410 may determine and exchange lists of discovered channels based at least in part on transmissions from CBSDs 410. Using CBSD 110-1 as an example, CBSD 110-1 may aggregate the lists of discovered channels into the list of active channels, such as $f_1$, $f_2$, $f_3$ and $f_4$. Then, CBSD 110-1 may provide the list of active channels to an electronic device (such as electronic device 112 in FIG. 1).

Figure 5:
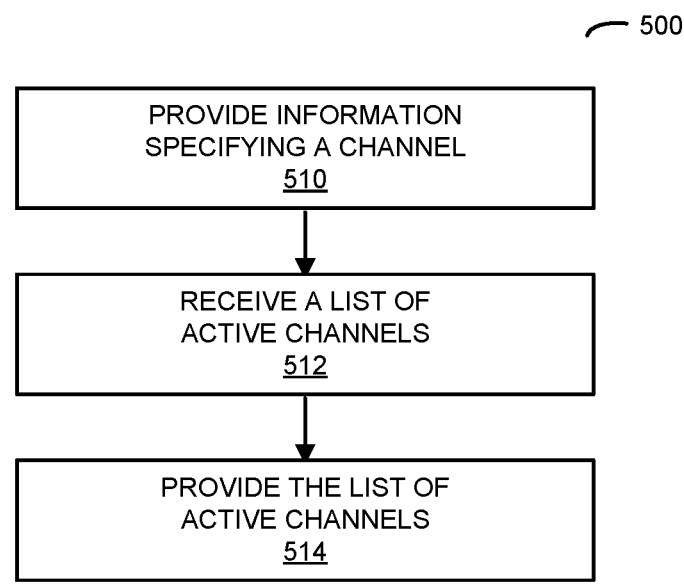
FIG. 5 is a flow diagram illustrating an example of a method for providing a list of active channels using a radio node in FIG. 1 in accordance with an embodiment of the present disclosure.

FIG. 5 presents a flow diagram illustrating an example of a method 500 for providing a list of available channels, which may be performed by a radio node (such as one of radio nodes 110 in FIG. 1). During operation, a second interface circuit in the radio node may provide, addressed to a computer, information specifying a channel (operation 510) used by the radio node. Then, a second interface circuit in the radio node may receive, associated with the computer, a list of active channels (operation 512) associated with the radio node and one or more second radio nodes in a network. Next, a first interface circuit in the radio node may provide the list of active channels (operation 514) addressed to an electronic device.

Moreover, the network may include a small cell. Furthermore, the channels may be portions of a spectrum in a shared-license-access band of frequencies. For example, the channels may be included in a Citizens Broadband Radio Service.

Additionally, the computer may include a controller for the radio node and the one or more second radio nodes. Consequently, the computer may be different from a SAS.

In some embodiments, the second interface circuit may use wired communication.

Note that the radio node may include: an eNodeB, a UMTS NodeB and RNC, a New Radio (NR) gNB or gNodeB, etc.

In some embodiments of method 500, there may be additional or fewer operations. Furthermore, the order of the operations may be changed, and/or two or more operations may be combined into a single operation. For example, instead of receiving information that specifies the channels from one or more radio nodes, the computer may obtain the information from a SAS.

Figure 6:
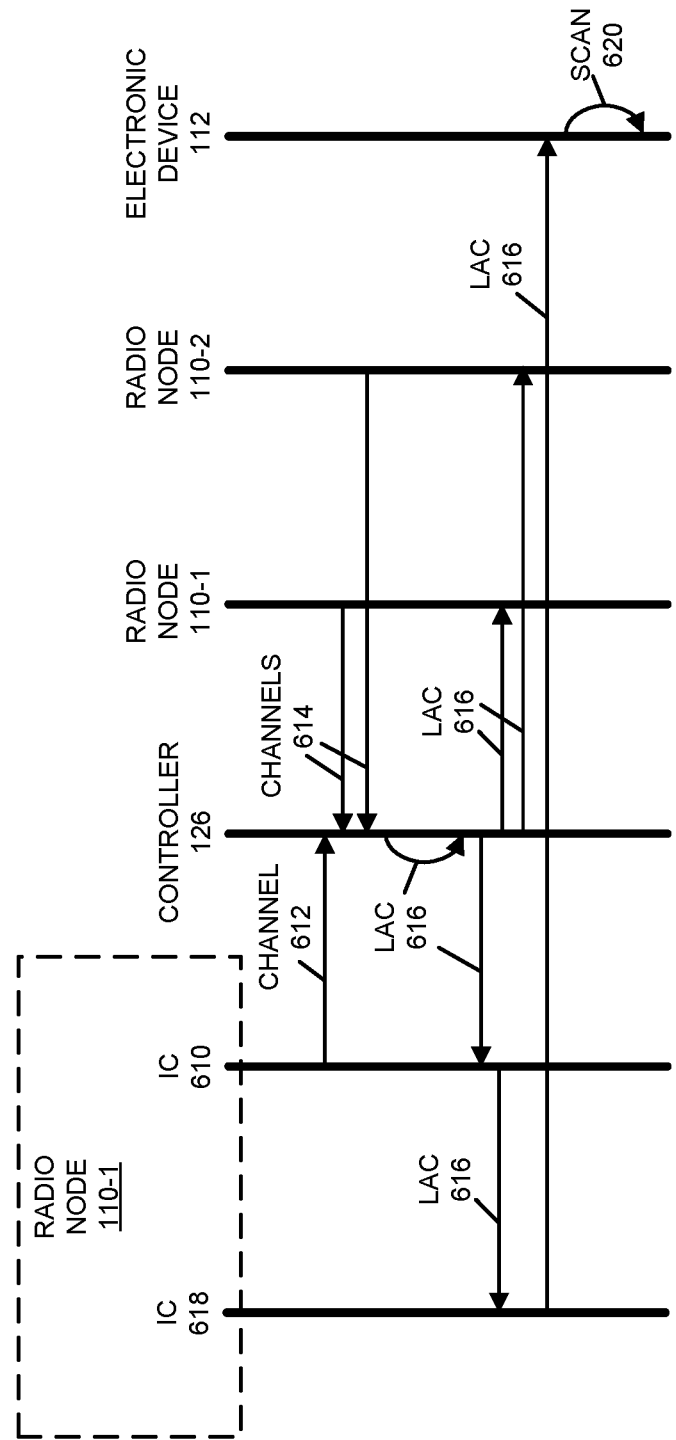
FIG. 6 is a drawing illustrating an example of communication among the electronic devices in FIG. 1 in accordance with an embodiment of the present disclosure.
Figure 7:
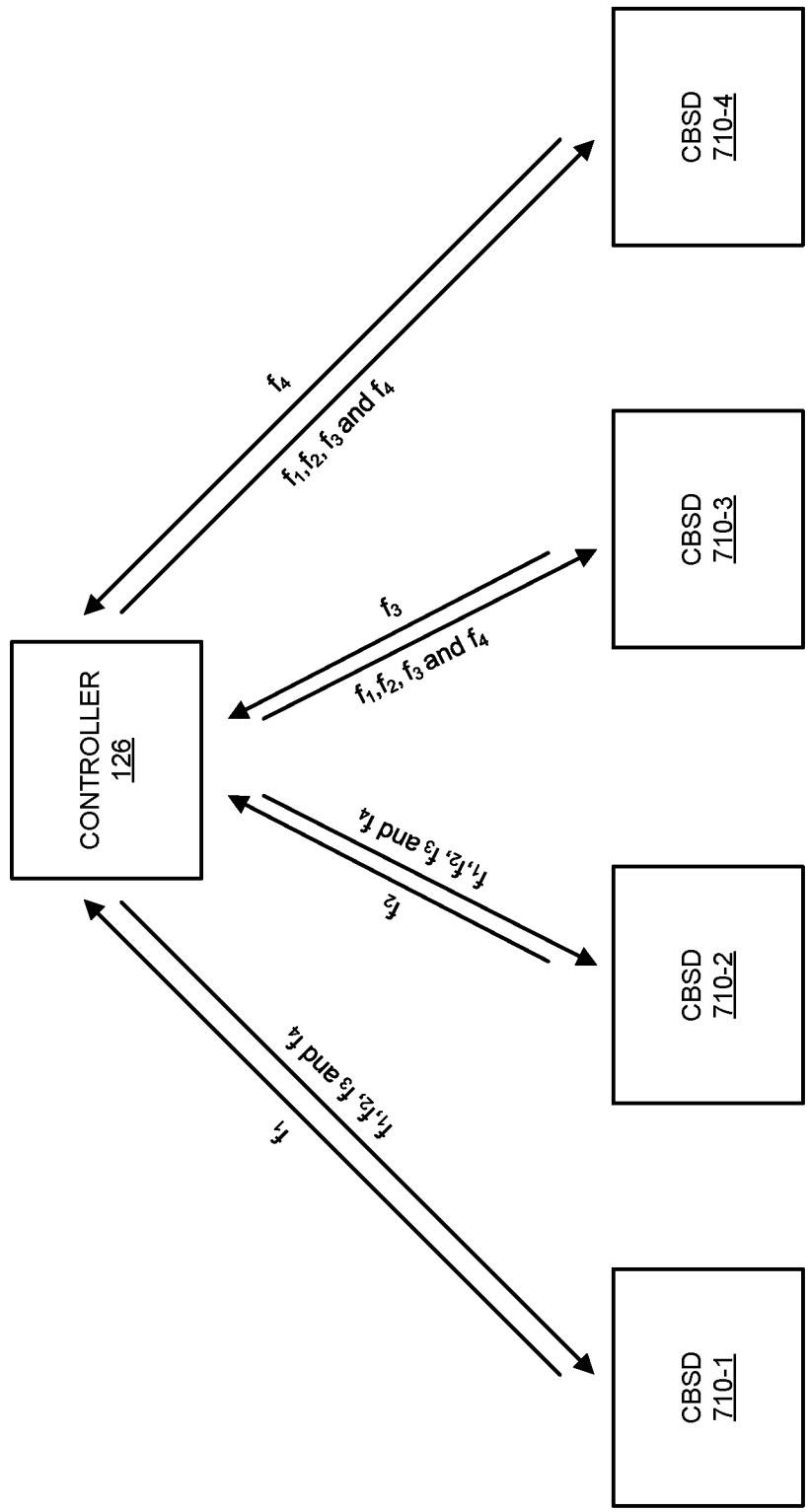
FIG. 7 is a drawing illustrating an example of a technique for providing a list of active channels in accordance with an embodiment of the present disclosure.

Embodiments of the communication techniques are further illustrated in FIG. 6, which presents a drawing illustrating an example of communication among radio node s110, controller 126 and electronic device 112. In FIG. 6, an interface circuit (IC) 610 in radio node 110-1 may provide information specifying a channel 612 used by radio node 110-1 to controller 126. For example, the information may be provided using wired communication. In addition, radio nodes 110-2 and 110-3 may provide similar information specifying channels 614 used by these radio nodes to controller 126.

After receiving the information specifying channels 612 and 614, controller 126 may aggregate this information into a list of active channels 616 in a network. Then, controller 126 may provide the list of active channels 616 that are used by radio nodes 110 to radio nodes 110.

Moreover, after receiving the list of active channels 616, interface circuit 610 may provide the list of active channels 616 to an interface circuit 618 in radio node 110-1. Next, interface circuit 618 may provide the list of active channels 616 to electronic device 112. For example, the list of active channels 616 may be provided to electronic device 112 using wireless communication.

Furthermore, after receiving the list of active channels 616, electronic device 112 may perform a wireless scan 620 based at least in part on the list of active channels 616.

While FIG. 6 illustrates communication between components using unidirectional or bidirectional communication with lines having single arrows or double arrows, in general the communication in a given operation in this figure may involve unidirectional or bidirectional communication.

In some embodiments of the communication techniques, a controller aggregates and then disseminates a list of active channels. This is illustrated in FIG. 7, which presents a drawing illustrating an example of a technique for providing a list of active channels 714 used by CBSDs 710 in the CBRS. Notably, CBSDs 710 may provide information specifying channels that are used by CBSDs 710 in a network to controller 126. After receiving the information, controller 126 may aggregate the information about channels into the list of active channels (such as $f_1$, $f_2$, $f_3$ and $f_4$), which is then provided to CBSDs 710. Using CBSD 710-1 as an example, after receiving the list of active channels, CBSD 710-1 may provide the list of active channels to an electronic device (such as electronic device 112 in FIG. 1).

In some embodiments, the communication techniques are used for neighbor channel discovery. Notably, the CBRS band is a conditionally free spectrum for electronic devices to transmit over the air. Each CBSD (such as an eNodeB) can get spectrum within the allowed 150 MHz bandwidth. Depending up on the size of a channel being used by a given CBSD, there may be up to 30 channels in a venue.

In traditional cellular communications only handful of channels may be available for transmission for an operator or in a deployment. Each transmitting electronic device may be manually provisioned with the specific list and the list may be broadcasted over the air in system information (SIBs). This list may be used by electronic devices for measurement purposes, which is used for handover decisions when an electronic device is going out of the coverage of a serving cell. This list may also used by an electronic device for joining the network after it wakes up from idle mode and for reselecting the best eNodeB for connecting to the network.

Because the channel list in a CBRS network may be long and the channels are dynamically allocated, statically provisioning all possible 30 channels may result in inefficiency in the network, because an electronic device may spend more time scanning other channels. In turn, this may result in an adverse communication-performance impact on the electronic device, such as throughput degradation and reduced battery operating time.

The disclosed communication techniques may address these problems in a distributed manner and/or a centralized manner. In a distributed approach, each CBSD may learn the list of channels available in the deployment and may broadcast this information to the electronic device(s) that are connected to a network. This information may be updated whenever there is a change in the network, such as when a new channel is added or when a channel in an existing list is relinquished.

In a centralized approach, each radio node may publish the channel(s) they are using for transmitting to a centralized management entity, such as a computer or a controller. The centralized management entity may consolidate or aggregate this information and may update each radio node with the resulting list. Note that the centralized management entity may perform this operation whenever there is a change in the network, such as when a new channel is added or when an existing channel is released. Moreover, upon receiving this information, each radio node may broadcast it in the system information to the electronic device(s) that are connected to a network.

A variety of techniques may be used in the communication techniques. For example, the learning in the distributed approach may be spectrum-query based. Notably, the CBRS architecture may include a SAS and CBSDs. The SAS may be responsible for managing the spectrum and the CBSDs may use the spectrum. Moreover, each CBSD may request a grant for a specific channel and the SAS may provide the grant if the requested spectrum is available. As part of the SAS-CBSD protocol, a CBSD may periodically query the SAS for the available spectrum within the whole CBRS band (which is 150 MHz). This procedure is sometimes referred to as a 'spectrum inquiry.'

Once the SAS returns the list of available channels, each CBSD may uses this list to perform a network listen. Using the network listen procedure, each CBSD can discover the existence of one or more other CBSDs. Moreover, once the CBSDs are discovered during this process, the list of channels in use may be recorded. At the end of the discovery process, the discovered list may be advertised to the electronic device(s) in the system information.

Figure 8:
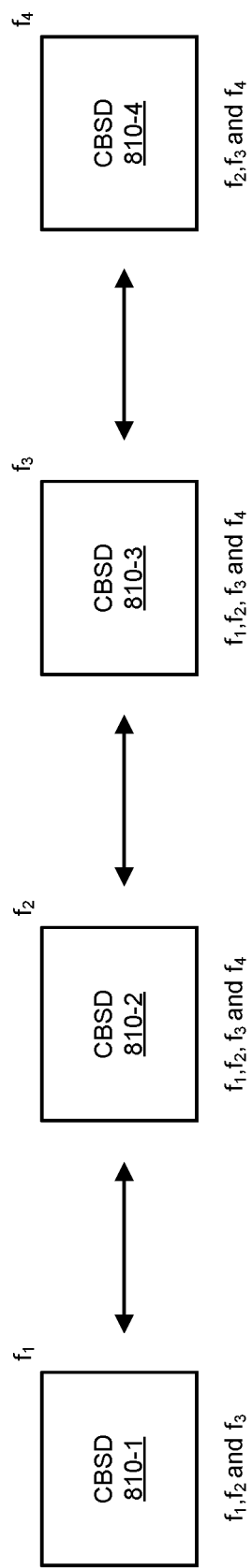
FIG. 8 is a drawing illustrating an example of channel discovery in accordance with an embodiment of the present disclosure.

As shown in FIG. 8, which presents a drawing illustrating an example of channel discovery, in some embodiments learning may be based at least in part on already established neighbor relationships. For example, CBSDs 810 may have one or more neighbors. Moreover, CBSDs 810 may exchange, with their neighbors, information that specifies the channel that they are using. Over a period of time, each of CBSDs 810 may have the complete channel-usage information within the network. Using this information, each of CBSDs 810 may derive the channel list that needs to be broadcasted in the system information for the electronic device(s).

Figure 9:
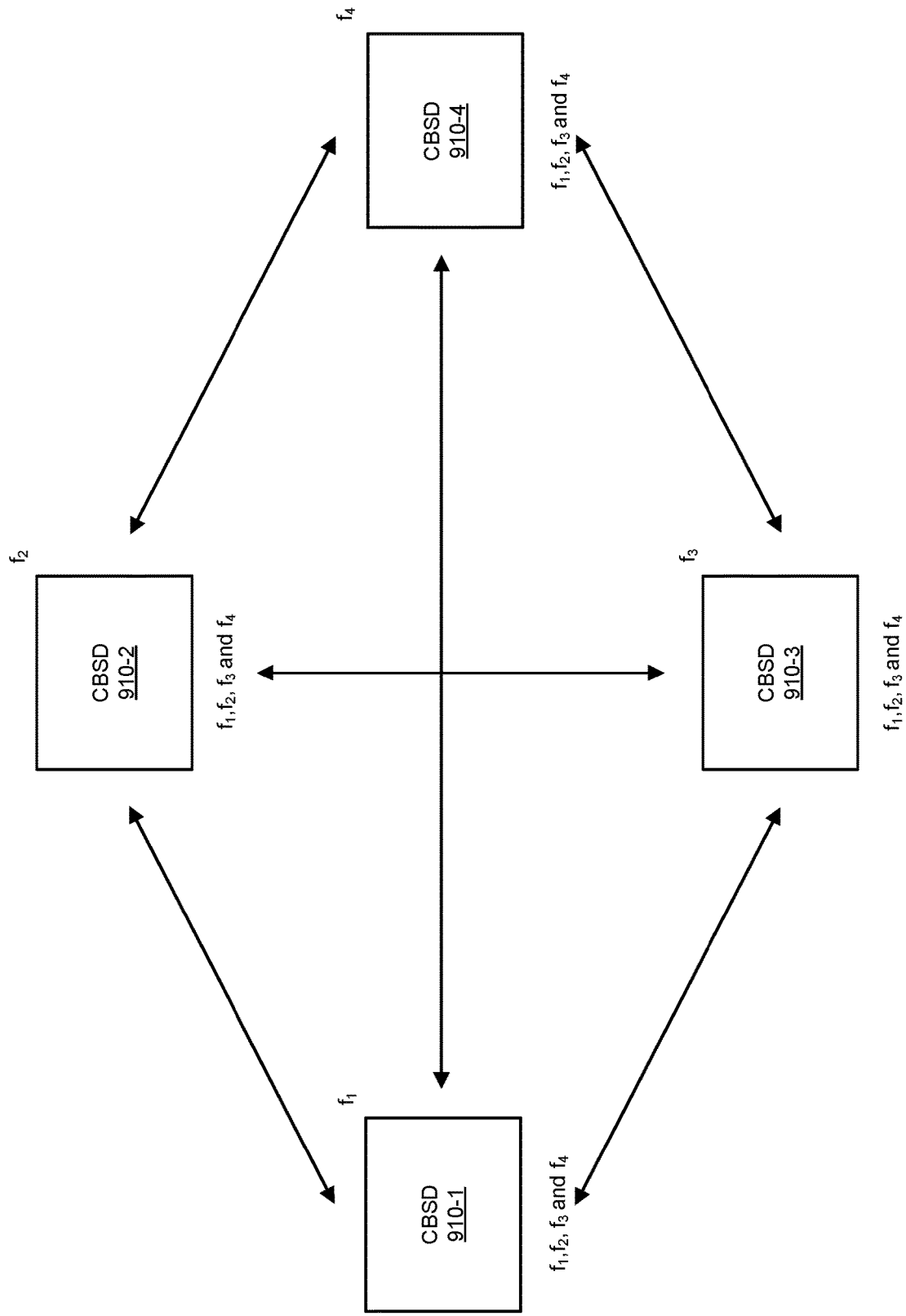
FIG. 9 is a drawing illustrating an example of channel discovery in accordance with an embodiment of the present disclosure.

Furthermore, as shown in FIG. 9, which presents a drawing illustrating an example of channel discovery, in some embodiments multicast-based discovery is used. Notably, each of CBSDs 910 may advertise its channel usage in a multicast message. The CBSDs 910 listening to the multicast message may get to know the channel information within the network. Using this information, each of CBSDs 910 may prepare a channel list that is broadcast in the system information for the electronic device(s).

In some embodiments, one or more of the preceding techniques may be used in the distributed approach and/or the centralized approach to aggregate a larger list. In order to optimize further, each CBSD may use network listen for further filtering. For example, a first level list may be prepared as discussed previously, which may then be used as an input to a network-listen module. Note that some of the CBSDs using the channels may be too far from one that is performing a network listen. These CBSDs may be filtered out if the network listen cannot find them. However, the channels of the CBSDs that are discovered using the network listen may be used to prepare a second list. Alternatively or additionally, the list may be pruned based at least in part on a received signal strength of each discovered CBSD. This criterion may be used to prune or filter out too CBSDs that are located far away. An output of this process may be used to update the system information that is broadcast to the electronic device(s).

We now describe embodiments of an electronic device, which may perform at least some of the operations in the communication techniques. FIG. 10 presents a block diagram illustrating an example of an electronic device 1000 in accordance with some embodiments, such as one of radio nodes 110, electronic device 112 computer 124. This electronic device includes processing subsystem 1010, memory subsystem 1012, and networking subsystem 1014. Processing subsystem 1010 includes one or more devices configured to perform computational operations. For example, processing subsystem 1010 can include one or more microprocessors, graphics processing units (GPUs), ASICs, microcontrollers, programmable-logic devices, and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory. In some embodiments, instructions for processing subsystem 1010 in memory subsystem 1012 include: one or more program modules or sets of instructions (such as program module 1022 or operating system 1024), which may be executed by processing subsystem 1010. Note that the one or more computer programs or program modules may constitute a computer-program mechanism. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

In addition, memory subsystem 1012 can include mechanisms for controlling access to the memory. In some embodiments, memory subsystem 1012 includes a memory hierarchy that comprises one or more caches coupled to a memory in electronic device 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by electronic device 1000 as fast-access storage for often-used data, while the mass-storage device is used to store less frequently used data.

Networking subsystem 1014 includes one or more devices configured to couple to and communicate on a wired and/or wireless network (i.e., to perform network operations), including: control logic 1016, an interface circuit 1018 and one or more antennas 1020 (or antenna elements). (While FIG. 10 includes one or more antennas 1020, in some embodiments electronic device 1000 includes one or more nodes, such as antenna nodes 1008, e.g., a pad, which can be coupled to the one or more antennas 1020, or nodes 1006, which can be coupled to a wired or optical connection or link. Thus, electronic device 1000 may or may not include the one or more antennas 1020. Note that the one or more nodes 1006 and/or antenna nodes 1008 may constitute input(s) to and/or output(s) from electronic device 1000.) For example, networking subsystem 1014 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 1000 may be adapted or changed using pattern shapers (such as reflectors) in one or more antennas 1020 (or antenna elements), which can be independently and selectively electrically coupled to ground to steer the transmit antenna pattern in different directions. Thus, if one or more antennas 1020 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1000 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1000 may use the mechanisms in networking subsystem 1014 for performing simple wireless communication between the electronic devices, e.g., transmitting advertising or beacon frames and/or scanning for advertising frames transmitted by other electronic devices as described previously.

Within electronic device 1000, processing subsystem 1010, memory subsystem 1012, and networking subsystem 1014 are coupled together using bus 1028. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, electronic device 1000 includes a display subsystem 1026 for displaying information on a display, which may include a display driver and the display, such as a liquid-crystal display, a multi-touch touchscreen, etc.

Electronic device 1000 can be (or can be included in) any electronic device with at least one network interface. For example, electronic device 1000 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or display subsystems. Additionally, one or more of the subsystems may not be present in electronic device 1000. Moreover, in some embodiments, electronic device 1000 may include one or more additional subsystems that are not shown in FIG. 10. Also, although separate subsystems are shown in FIG. 10, in some embodiments some or all of a given subsystem or component can be integrated into one or more of the other subsystems or component(s) in electronic device 1000. For example, in some embodiments program module 1022 is included in operating system 1024 and/or control logic 1016 is included in interface circuit 1018.

Moreover, the circuits and components in electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1014. The integrated circuit may include hardware and/or software mechanisms that are used for transmitting wireless signals from electronic device 1000 and receiving signals at electronic device 1000 from other electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wireless communication techniques may be used. For example, instead of Ethernet, a communication protocol that is compatible with the Internet Protocol is used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program module 1022, operating system 1024 (such as a driver for interface circuit 1018) or in firmware in interface circuit 1018. Thus, the communication techniques may be implemented at runtime of program module 1022. Alternatively or additionally, at least some of the operations in the communication techniques may be implemented in a physical layer, such as hardware in interface circuit 1018.

While examples of numerical values are provided in the preceding discussion, in other embodiments different numerical values are used. Consequently, the numerical values provided are not intended to be limiting.

While the preceding embodiments illustrated the use of the communication techniques with CBRS (e.g., a frequency band near 3.5 GHz), in other embodiments of the communication techniques different wireless signals and/or different frequency band(s) may be used. For example, the wireless signals may be communicated in one or more bands of frequencies, including: 900 MHz, 2.4 GHz, 5 GHz, 60 GHz, and/or a band of frequencies used by LTE or another cellular-telephone communication protocol.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
a first node or connector configured to communicatively couple to an antenna;
a second node or connect configured to communicatively couple to a network;
a first interface circuit, communicatively coupled to the first node or connector, configured to communicate using wireless communication;
a second interface circuit, communicatively coupled to the second node or connector, configured to communicate with a computer system via a network, wherein the radio node is configured to:
provide, using the second interface circuit and addressed to the computer system, information specifying an active channel used by the radio node;
receive, using the second interface circuit and associated with the computer system, second information specifying a list of active channels used by the radio node and one or more second radio nodes in the network; and
provide, using the first interface circuit and addressed to an electronic device, the second information specifying the list of active channels, wherein the electronic device is different from the radio node and the one or more second radio nodes, and the electronic device is connected to the radio node.

2. The radio node of claim 1, wherein the network comprises a small cell.

3. The radio node of claim 1, wherein the active channels in the list of active channels comprises portions of a spectrum in a shared-license-access band of frequencies.

4. The radio node of claim 3, wherein the active channels are included in a Citizens Broadband Radio Service.

5. The radio node of claim 1, wherein the computer system comprises a controller for the radio node and the one or more second radio nodes.

6. The radio node of claim 1, wherein the computer system is different from a spectrum allocation server (SAS).

7. The radio node of claim 1, wherein the second interface circuit uses wired communication.

8. The radio node of claim 1, wherein the radio node comprises: an Evolved Node B (eNodeB), a Universal Mobile Telecommunications System (UMTS) NodeB and radio network controller (RNC), or a New Radio (NR) gNB or gNodeB.

9. A non-transitory computer-readable storage medium for use in conjunction with a radio node, the computer-readable storage medium storing program instructions that, when executed by the radio node, cause the radio node to perform operations comprising:
providing, addressed to a computer system, information specifying an active channel used by the radio node;
receiving, associated with the computer system, second information specifying a list of active channels used by the radio node and one or more second radio nodes in the network; and
providing, addressed to an electronic device, the second information specifying the list of active channels, wherein the electronic device is different from the radio node and the one or more second radio nodes, and the electronic device is connected to the radio node.

10. The non-transitory computer-readable storage medium of claim 9, wherein the network comprises a small cell.

11. The non-transitory computer-readable storage medium of claim 9, wherein the active channels in the list of active channels comprises portions of a spectrum in a shared-license-access band of frequencies.

12. The non-transitory computer-readable storage medium of claim 11, wherein the active channels are included in a Citizens Broadband Radio Service.

13. The non-transitory computer-readable storage medium of claim 9, wherein the computer system comprises a controller for the radio node and the one or more second radio nodes.

14. The non-transitory computer-readable storage medium of claim 9, wherein the computer system is different from a spectrum allocation server (SAS).

15. A providing second information specifying a list of active channels, comprising:
by a radio node:
providing, addressed to a computer system, information specifying an active channel used by the radio node;
receiving, associated with the computer system, the second information specifying the list of active channels used by the radio node and one or more second radio nodes in the network; and
providing, addressed to an electronic device, the second information specifying the list of active channels, wherein the electronic device is different from the radio node and the one or more second radio nodes, and the electronic device is connected to the radio node.

16. The method of claim 15, wherein the network comprises a small cell.

17. The method of claim 15, wherein the active channels in the list of active channels comprises portions of a spectrum in a shared-license-access band of frequencies.

18. The method of claim 17, wherein the active channels are included in a Citizens Broadband Radio Service.

19. The method of claim 15, wherein the computer system comprises a controller for the radio node and the one or more second radio nodes.

20. The method of claim 15, wherein the computer system is different from a spectrum allocation server (SAS).

* * * * *